(12) United States Patent
Battle

(10) Patent No.: US 10,058,484 B2
(45) Date of Patent: Aug. 28, 2018

(54) MEASURED FLUID DISPENSER

(71) Applicant: Matthew Battle, Canton, OH (US)

(72) Inventor: Matthew Battle, Canton, OH (US)

( * ) Notice: Subject to any disclaimer, the term of this patent is extended or adjusted under 35 U.S.C. 154(b) by 0 days.

(21) Appl. No.: 15/047,777

(22) Filed: Feb. 19, 2016

(65) Prior Publication Data

US 2016/0243003 A1     Aug. 25, 2016

Related U.S. Application Data

(60) Provisional application No. 62/118,800, filed on Feb. 20, 2015.

(51) Int. Cl.
*A61J 7/00* (2006.01)
*G01F 11/26* (2006.01)
*A61J 1/22* (2006.01)

(52) U.S. Cl.
CPC .......... *A61J 7/0076* (2013.01); *A61J 7/0046* (2013.01); *G01F 11/265* (2013.01); *A61J 1/22* (2013.01)

(58) Field of Classification Search
CPC ........... A61J 7/0076; A61J 7/0046; A61J 1/22

USPC .......... 222/367, 454, 368, 536, 363, 355, 48
See application file for complete search history.

(56) References Cited

U.S. PATENT DOCUMENTS

| | | | | |
|---|---|---|---|---|
| 1,368,270 A | * | 2/1921 | Lissman | G01F 11/24 222/185.1 |
| 2011/0101023 A1 | * | 5/2011 | Chan | G01F 11/20 222/1 |
| 2011/0163118 A1 | * | 7/2011 | Gieda | G01F 11/24 222/1 |

* cited by examiner

*Primary Examiner* — Donnell Long
(74) *Attorney, Agent, or Firm* — Renner, Otto, Boisselle & Sklar, LLP

(57) ABSTRACT

A measured fluid dispenser includes a moveable member coupled with a liquid containing bottle. The moveable member is preferably spherical defining an internal volume therein. The moveable member defines two openings wherein only one opening intersects the longitudinal axis at one time. This allows the internal volume of the moveable member to be filled with liquid from the bottle, then rotated, then the measured fluid or liquid is dispensed from the moveable member.

22 Claims, 14 Drawing Sheets

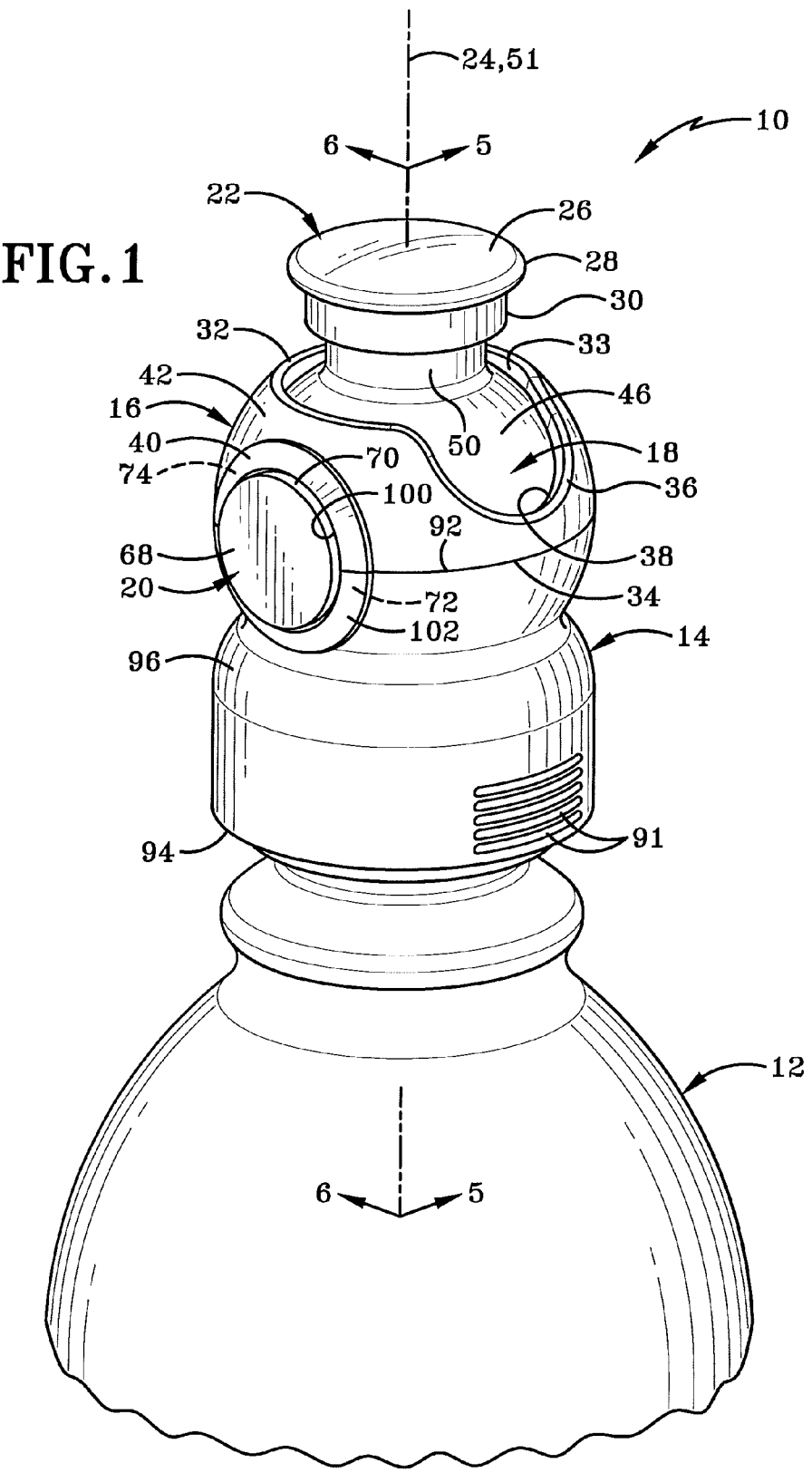

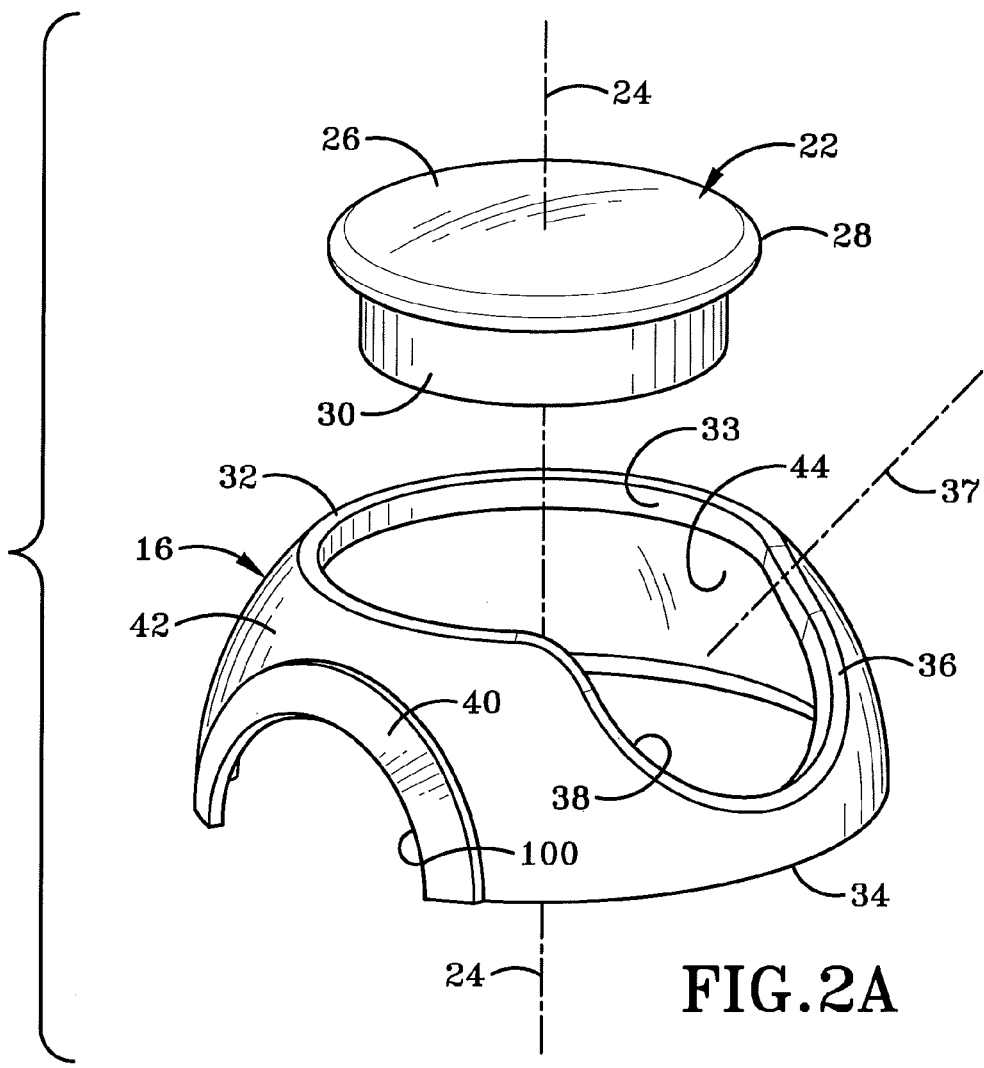

MEASURED FLUID DISPENSER

CROSS REFERENCE TO RELATED APPLICATIONS

This application claims the benefit of U.S. Provisional Patent Application Ser. No. 62/118,800, filed on Feb. 20, 2015; the disclosure of which is entirely incorporated herein by reference.

BACKGROUND

Technical Field

The present disclosure relates generally to the field of fluid dispensers. More particularly, the present disclosure relates to a measured fluid dispenser. Specifically, the present disclosure relates to a measured fluid dispenser connected to a bottle including a rotatable spherical member retaining a desired volume of fluid.

Background Information

Selectively measuring a desired amount of fluid for a specific use has been desirable for a long period of time. To date, there exists many ways to measure fluid. One such exemplary way is through the use of a measuring cup including delineated markers along the side of the cup to visually indicate to a user how much fluid is contained therein and dispensed from a bottle.

Measuring cups are ordinarily separable from containers containing medicine which leads to them often getting lost. Furthermore, the delineations on the measuring cups are very small and integrally formed into the plastic which may cause some users difficulty in visually seeing the demarcations on the cup which could result in an improper dosage of medicine.

SUMMARY

Issues continue to exist with measured fluid dispensers as they are currently known in the art. For example, measuring cups may become lost or inadvertently discarded as they are purposefully separable from the container containing medicine. Additionally, problems continue to exist with the proper measurement of fluid through the use of measuring cups because it may be difficult for a person to see how much fluid should be poured into the cup or how much volume is actually contained within the cup. The present disclosure addresses these and other issues.

In one aspect, the present disclosure provides a measured fluid dispenser to overcome the needs that continue to exist that measuring cups do not fulfill. Namely, on aspect of the present disclosure may provide a device that measures a predetermined or preset amount of fluid that is determined by an internal cavity on a spherical member attached adjacent the top of a bottle or container. The internal volume is set preferably by a dosage or dispensed amount and solves the need of dispensing a set amount of fluid without the person seeing how much needs to be poured from the container. For example, if a person needs 50 mL of medicine to be dispensed from a medicine container, the internal cavity of the present disclosure is 50 mL and the person can dispense the set amount from the container without having to visually confirm linear demarcations on a cup.

In one aspect, the present disclosure may provide a measured fluid dispenser comprising: a moveable member defining an internal volume; a spout defining a first opening centered along a longitudinal axis; an edge defining a second opening offset from the longitudinal axis; and wherein the fluid dispenser is connected to a fluid containing bottle adjacent an opening defined by the bottle and configured to dispense a measured amount of fluid therefrom.

In another aspect, the present disclosure may provide a measured fluid dispenser including a moveable member coupled with a liquid containing bottle. The moveable member is preferably spherical defining an internal volume therein. The moveable member defines two openings wherein only one opening intersects the longitudinal axis at one time. This allows the internal volume of the moveable member to be filled with liquid from the bottle, then rotated, then the measured fluid or liquid is dispensed from the moveable member.

In another aspect, an embodiment of the present disclosure may provide a measured fluid dispenser comprising: a moveable member defining an internal volume; a spout on the moveable member defining a first opening centered along a spout axis; an edge defining a second opening in the moveable member, wherein the second opening does not intersect the spout axis; and wherein the fluid dispenser is connected to a fluid containing bottle adjacent a bottle opening and configured to dispense a measured amount of fluid therefrom, wherein the measured amount of fluid dispensed from the bottle is dependent on the internal volume.

In another aspect, an embodiment of the present disclosure may provide a fluid dispenser comprising: a housing first portion adapted to be coupled with a container filled with fluid; a moveable fluid measuring and dispensing member at least partially received within the housing first portion, wherein the fluid measuring and dispensing member is adapted to fluidly communicate with the container to measure fluid to be dispensed therefrom; wherein the fluid measuring and dispensing member moves between a closed first position and an open second position and the amount of fluid dispensed depends on the size of the fluid measuring and dispensing member.

In another aspect, an embodiment of the present disclosure may provide a method comprising the steps of: moving a fluid measuring and dispensing member defining an internal volume from a closed first position to an open second position within a housing attached to a fluid filled container; inverting the container to effect fluid movement into the internal volume via gravitational force; moving the fluid measuring member and dispensing member from the open second position back to the closed position to retain an amount of fluid inside the internal volume; and reverting the container to an upright position.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 1 is a perspective view of a measured fluid dispenser of the present disclosure connected to a fluid containing bottle;

FIG. 2 is a schematic representation of the orientation of FIG. 2A, FIG. 2B, and FIG. 2C;

FIG. 2A is an exploded perspective view of components of the measured fluid dispenser to be viewed in conjunction with FIG. 2B and FIG. 2C in the orientation presented in FIG. 2;

Similar numbers refer to similar parts throughout the drawings.

DETAILED DESCRIPTION

Figure 2B:
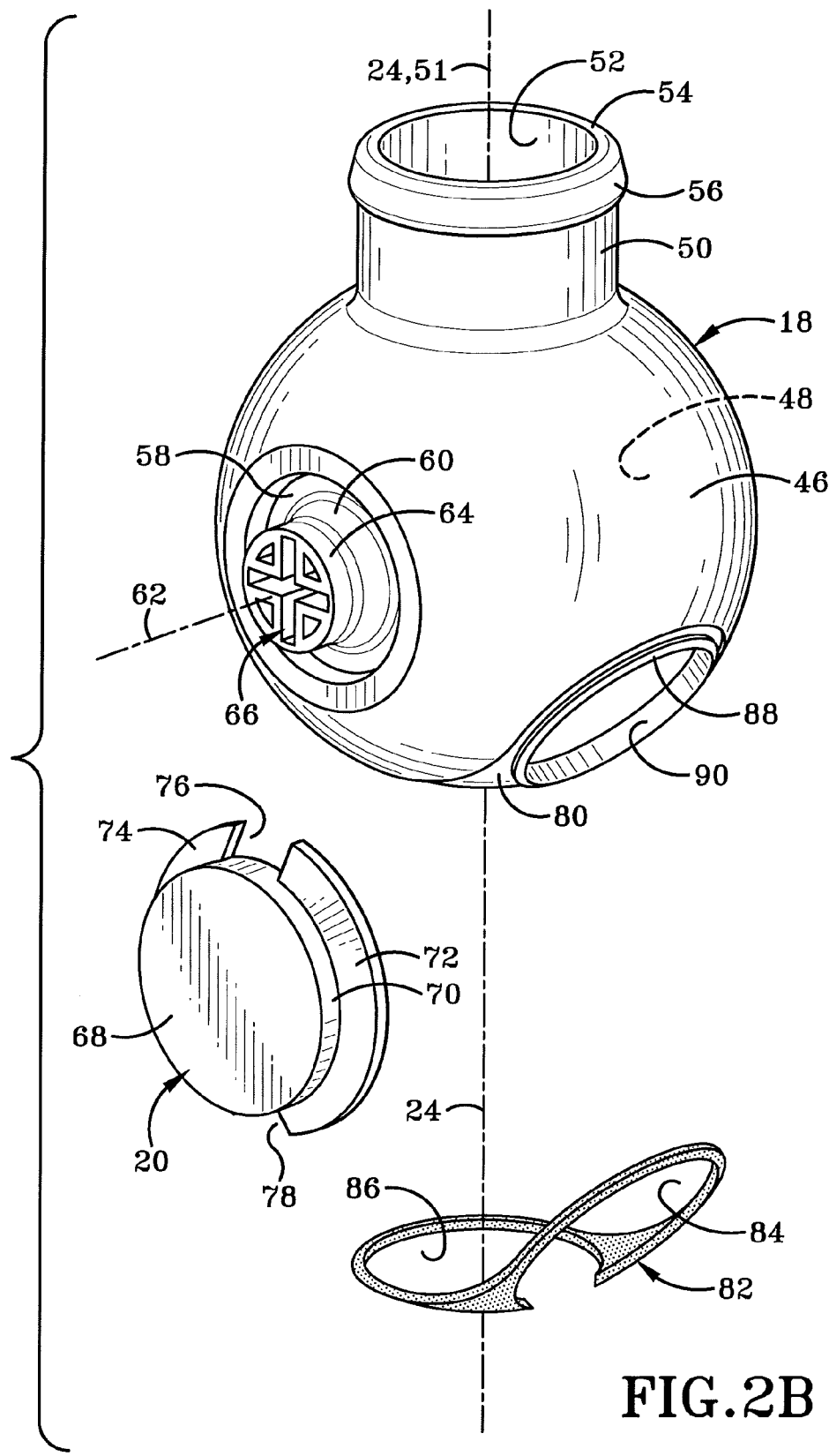
FIG. 2B is an exploded perspective view of components of the measured fluid dispenser to be viewed in conjunction with FIG. 2A and FIG. 2C in the orientation presented in FIG. 2.

As depicted in FIG. 1, a measured fluid dispenser of the present disclosure is generally indicated at 10. The measured fluid dispenser 10 is attached to a fluid container or bottle 12 and configured to dispense a measured amount of fluid from bottle 12. Dispenser 10 comprises a first or lower housing 14, a second or upper housing 16, a moveable fluid retaining and measuring member 18, a button or lock member 20, and a cap 22. Dispenser 10 is longitudinally centered along axis 24 associated with housing 14 and housing 16.

Figure 2C:
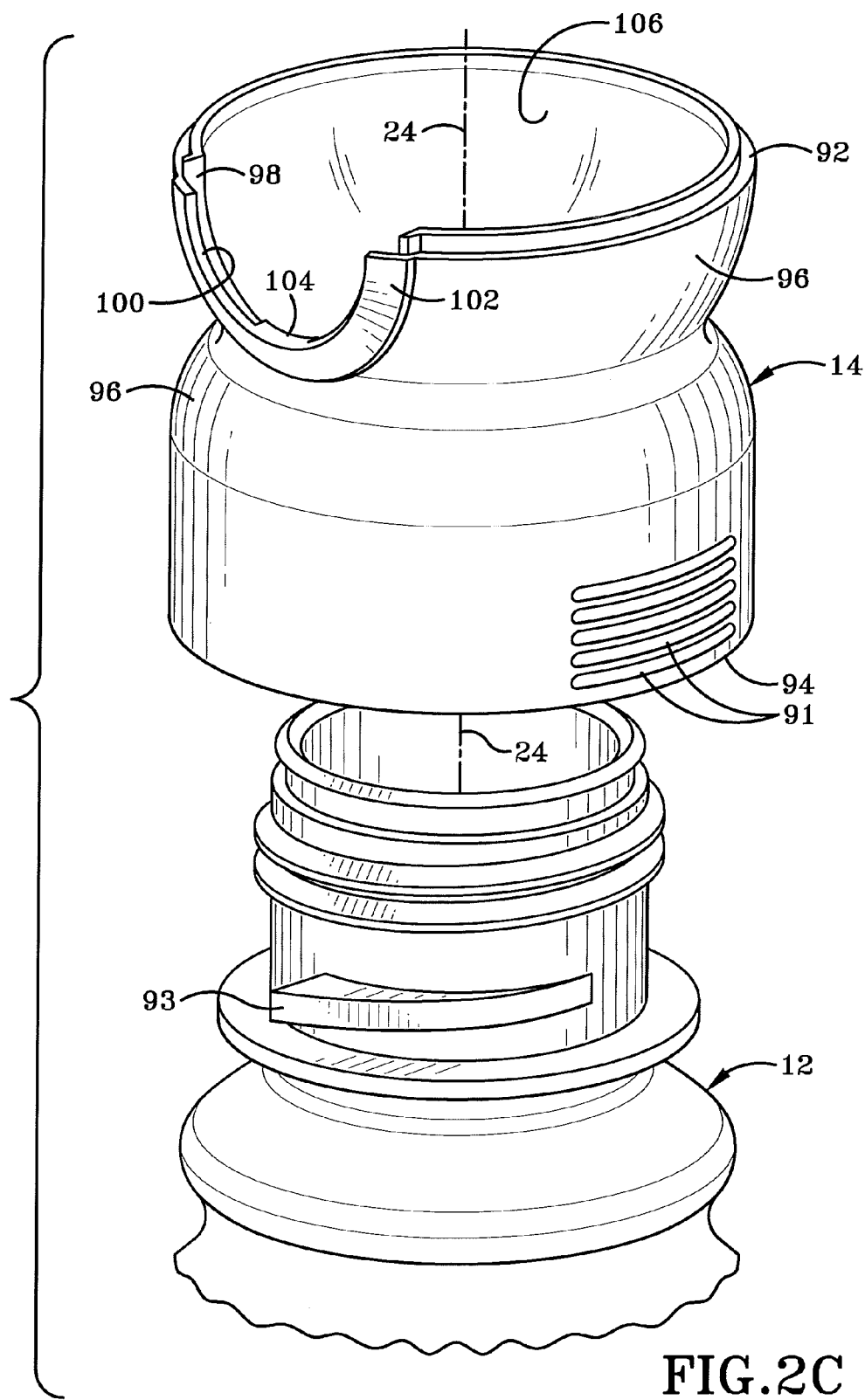
FIG. 2C is an exploded perspective view of components of the measured fluid dispenser to be viewed in conjunction with FIG. 2A and FIG. 2B in the orientation presented in FIG. 2.

As depicted in FIG. 2, a schematic representation of the exploded perspectives of FIG. 2A, FIG. 2B, and FIG. 2C are presented. FIG. 2 represents that the schematic exploded perspectives of FIG. 2A, FIG. 2B, and FIG. 2C should be vertically stacked such that when explodedly viewed together FIG. 2A is above the elements shown in FIG. 2B and FIG. 2C. The elements depicted in FIG. 2B are between the elements depicted in FIG. 2A and FIG. 2C, respectively. The elements depicted in FIG. 2C are below the elements depicted in FIG. 2A and FIG. 2B.

As depicted in FIG. 2A, cap 22 includes a top surface 26 intersecting longitudinal axis 24 bound by circumferential edge 28. Cylindrical sidewall 30 extends downwardly from a rigid connection adjacent edge 28. Cylindrical sidewall 30 may be an annular member having inner and outer surfaces defining a recess 31 therein, concentric with axis 24. When viewed in cross section, sidewall 30 is offset generally parallel to axis 24.

With continued reference to FIG. 2A, second or upper housing 16 is a generally hemispherical member including an upper rim 32 spaced opposite a lower rim 34. Upper rim 32 extends approximately 270° about axis 24 and is interrupted by a U-shaped edge 36 of the rim defining a cutout area 38. An axis 37 extends centrally through the middle of cutout 38 area. U-shaped edge 36 extends downwardly from upper rim 32 and along an arcuate path when viewed in cross section generally in a range from about 60° to about 10° relative to axis 62. Together, upper rim 32 and U-shaped edge 36 define an opening 33. Lower rim 34 is generally circular and partially interrupted by a first lock flange 40 arcuately extending upwardly from bottom rim 34 towards upper rim 32. A generally hemispherical sidewall 42, including inner and outer surfaces, extends between upper rim 32 and lower rim 34. Generally, hemispherical sidewall 42 includes a diameter near the lower rim 34 that is larger than the diameter of sidewall 42 near upper rim 32. Inner surface of hemispherical sidewall 42 defines a portion of an interior chamber 44. Interior chamber 44 is communication with cutout area 38 and opening 33.

Upper housing 16 is, in one particular embodiment, formed as a generally rigid or at least semi rigid member. In another particular embodiment, housing 16 is formed of a plastic or other polymer material, as one having ordinary skill in the art would understand, to form a generally monolithic member such that the components of upper housing 16 described above are integrally formed as a unitary monolithic piece of material. Lower housing 14 is formed from the same material as upper housing 16 and may be formed in a similar monolithic manner.

As depicted in FIG. 2B, spherical member 18 includes a hollow spherical body 46, defining an interior volume 48, with the center of spherical member 18 positioned along axis 24. Near the top of spherical member 18 is a spout 50. Spout 50 is a generally cylindrical member defining a lumen or opening 52 in communication with the interior volume 48 and bound by an annular member or lip 54 defining the top of spherical member 18. Annular member 54 may further include a protruding edge 56.

Spout 50 is centered about a spout axis 51 extending through the center of opening 52. When spherical member 18 is in the vertically aligned and locked position in its first position, the spout axis 51 is coplanar with longitudinal axis 24. When spherical member 18 is in an unlocked second position (suitable for dispensing fluid), the spout axis is rotated by an angle 35 such that spout axis 51 is coplanar with axis 37 associated with cutout 38. Angle 35 is in a range from 15 degrees to about 85 degrees. In one particular embodiment, angle 35 is between about 30 degrees and 60 degrees.

An outer surface of spherical body 46 defines at least one generally annular recess 58. Annular recess 58 is offset and generally parallel to longitudinal axis 24. A tapered wall 60 defines a portion of annular recess 58 and extends circumferentially in a tapered manner around a transverse axis 62. Transverse axis 62 is orthogonal and perpendicular to longitudinal axis 24. Cylindrical projection 64 extends away from longitudinal axis 24 parallel to transverse axis 62 and defines an X-shaped channel 66 therein.

With continued reference to FIG. 2B, button or lock member 20 includes outer surface 68 offset and generally parallel with longitudinal axis 24. A cylindrical sidewall 70 extends from a rigid connection with surface 68. A first C-shaped flange 72 is disposed circumferentially around the center of member 20 and a second C-shaped flange 74, also connected with sidewall 70, extends circumferentially around the center of member 20 in a mirrored relationship relative to first C-shaped flange 72. A first notch 76 is defined between first ends of first and second C-flanges 72, 74 and a second notch 78 is defined between second ends of first and second C-flanges 72, 74. First and second notch 76, 78 are diametrically opposite each other relative to the center of lock member 20 opposite transverse axis 62.

Adjacent the lower portion of spherical body 46 is a gasket or seal receiving recess 80 configured to receive gasket or seal 82 therein. Seal 82 is shaped in a general figure-eight configuration defining first and second apertures 84, 86 respectively. Aperture 84 surrounds a circular edge 88 defined by member body 46. Edge 88 defines an opening 90 in communication with interior volume 48. Opening 90 never intersects spout axis 51. Opening 90 is offset from longitudinal axis 24 and does not intersect longitudinal axis 24 when opening 52 of spout 50 is intersecting longitudinal axis 24. However, as will be described below, spherical member 18 is configured to rotate about axis 62 in a manner that allows opening 90 to intersect longitudinal axis 24 at which point opening 52 is out of plane and does not intersect longitudinal axis 24 and spout axis 51 is coplanar with axis 37.

When assembled, the upper portion of spherical member 18, which is the portion of sphere body 46 above transverse axis 62, resides within chamber 44 of second housing 16. Spout 50 concentric about axis 24 is disposed through opening 33 defined by upper rim 32 and aligned with U-shaped edge 36. Cylindrical projection 64 is disposed below arcuate lock flange 40 such that flange 40 extends in a semi-circular manner over cylindrical projection 64. Cap 22 is releasably attachable and detachable from spout 50 to cover opening 52.

Figure 5:
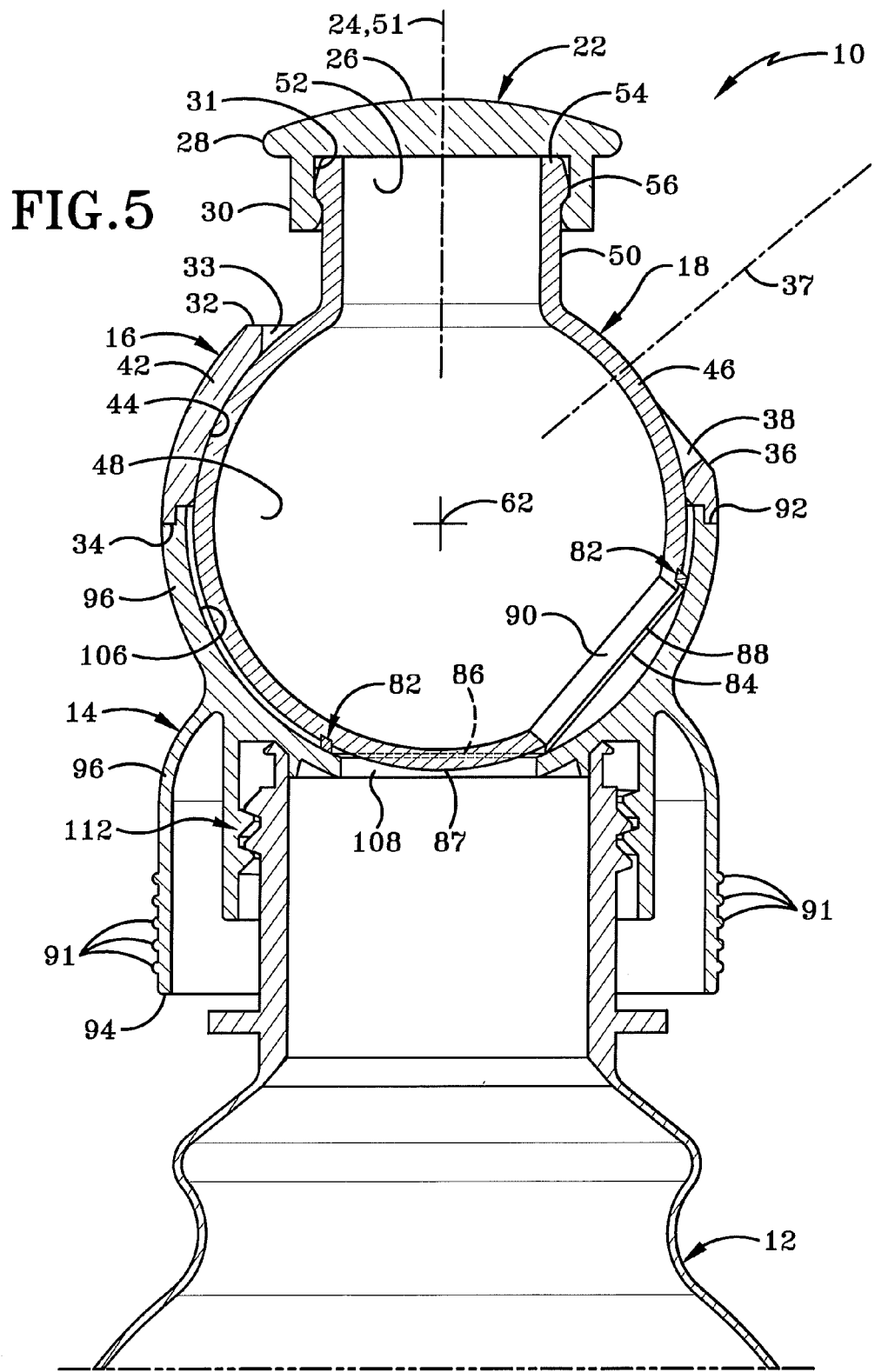
FIG. 5 is a cross section view of the measured fluid dispenser taken along line 5-5 in FIG. 1.

As depicted in FIG. 2C, first or lower housing 14 includes an upper rim 92 spaced opposite a lower rim 94 with a body sidewall 96 extending therebetween. Upper rim 92 is generally C-shaped and extends approximately 270° about axis 24 and is interrupted with a downwardly extending U-shaped edge 98 defining a button opening 100. A second lock flange 102 is generally C-shaped complimentary to first lock flange 40 closely adjacent U-shaped edge 98. A lower notch or protrusion 104 is disposed adjacent the bottom of second button flange 102 and is positioned above U-shaped edge 98. An upper portion of body sidewall 96 is hemispherical including inner and outer surfaces wherein the inner surface defines an interior chamber 106 shaped complimentary to a lower portion of spherical member 18, wherein the lower portion of spherical member 18 is the portion of body 46 below transverse axis 62. A lower portion of body sidewall 96 is generally cylindrical extending downwardly towards lower rim 94 including outer and inner surfaces wherein the inner surface defines a bottle receiving cavity. The bottle receiving cavity defined by the lower portion of body sidewall 96 may be in fluid communication with interior chamber 106 via an opening 108 (FIG. 5).

The top of bottle 12 can be threadably attached to lower housing 14 in a tamper proof and child resistant manner, as one having ordinary skill in the art associated with bottles containing medicines such as cough syrup or other medicine therein would understand. In one exemplary embodiment, bottle 12 includes at least one tapering flange 93 that mateably engages an inner surface of housing 14 adjacent lower rim 94. Tapering flange 93 may allow lower housing 14 to threadably attach to bottle 12 in a clockwise manner. However, lower housing 14 may by threadably detached from bottle 12 by depressing a thumb region 91, which is generally identified as horizontally aligned integrally formed linear gripping segments in FIG. 2C and rotating lower housing 14 in a counterclockwise direction. The depression of gripping members 91 causes a slight deformation of lower housing unit 14 such that the generally circular shape of lower rim 94 is deformed into an oval shape allowing protruding tabs on the inner surface of housing 14 adjacent lower rim to pass over the outer most portion of tapering flange 93 on bottle 12.

Figure 3:
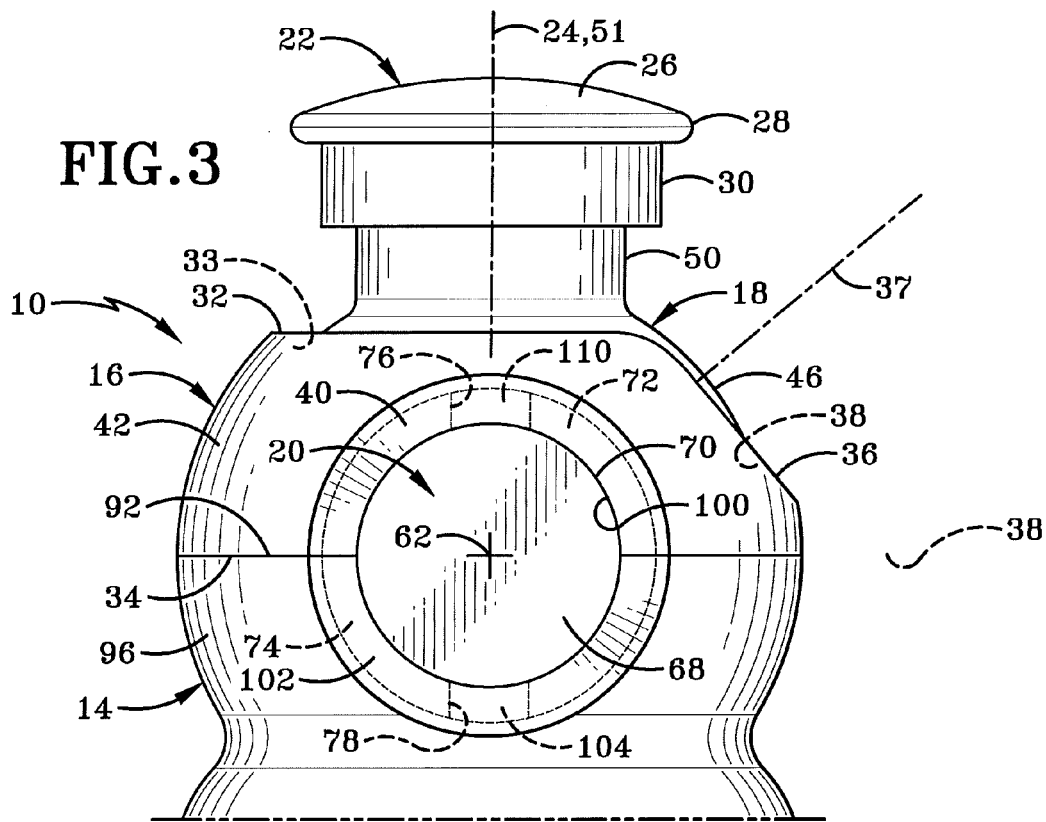
FIG. 3 is a side view of the measured fluid dispenser.

As depicted in FIG. 3, an upper protrusion 110 is diametrically opposite lower protrusion 104 relative to transverse axis 62. Upper protrusion 110 is positioned beneath upper first lock flange 40. When assembled, upper rim 92 of housing 14 meets and joins with lower rim 34 of housing 16 at a union creating a mid-plane intersecting transverse axis 62. An upper half of C-shaped flange 72 and an upper half of C-shaped flange 74 are disposed beneath first lock flange 40. A lower half of C-shaped flange 72 and a lower half of C-shaped flange 74 are disposed beneath second lock flange 102. Protrusion 110 is disposed within notch 76 and protrusion 104 is disposed within notch 78. The assembled position depicted in FIG. 3 is the locked position where spout 50 is vertically centered about longitudinal axis 24.

Figure 4:
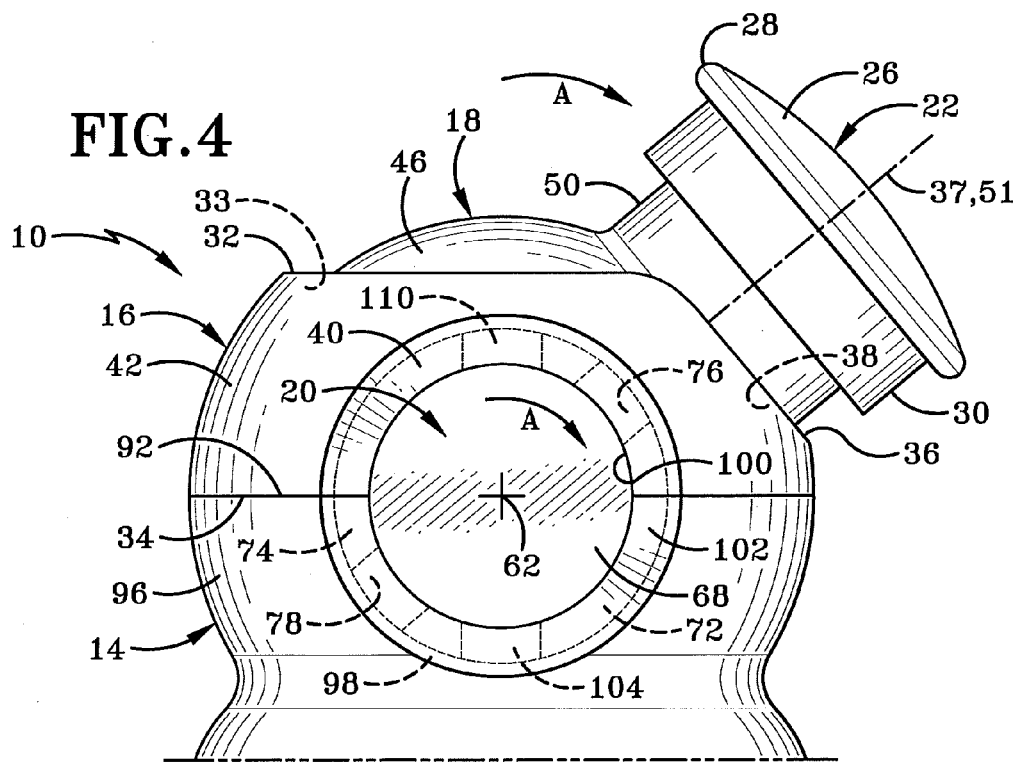
FIG. 4 is an operational side view of the measured fluid dispenser depicting rotation about a transverse axis.

As depicted in FIG. 4, measured fluid dispenser 10 may be moved to an unlocked position indicated in which notch 110 and lower protrusion 104 remain fixed at a twelve-o'clock and six-o'clock position respectively and button lock 20 is depressed transversely along axis 62 in the direction of axis 24 (note this direction would be the equivalent of being pushed into the page in FIG. 4). When button 20 is depressed, the spherical member 18 may be rotated in the direction of arrow A about transverse axis 62 which rotationally displaces openings 76, 78 away from protrusions 110, 104 respectively. When fluid dispenser 10 is moved into the unlocked position indicated in FIG. 4 and spherical member 18 has been rotated in the direction of arrow A, spout 50 is offset and does not intersect vertically aligned longitudinal axis 24. Further, spout opening 52 is positioned along angle 35 (FIG. 5) in the open position.

As depicted in FIG. 5, cap 22 releasably attaches to spout 50 via edge 56. In this position, interior chamber 48 is sealed and contained. Opening 90 is offset from opening 108 and is sealed via gasket 82 which precludes fluid movement from bottle 12 into interior chamber 48. A lower portion 87 of spherical member 18 encircled by second aperture 86 of seal 82 seals opening 108 preventing fluid from leaving bottle 12. Measured fluid dispenser 10 releasably attaches to bottle 12 and in the embodiment or example shown in FIG. 5, threads 112 ensure the releasable securement of dispenser 10 to bottle 12. A lower portion 87 of spherical member 17 is positioned within second aperture 86 of gasket 82. Lower portion 87 occupies opening 108 of lower housing 14 to preclude fluid movement out of bottle 12.

In accordance with one aspect of the present disclosure, the interior chamber 48 may be sized to dispense a desired volume of fluid from bottle 12. In one example, the fluid designed to be dispensed may be a medicine for administering to a person. In another exemplary embodiment, the fluid may be a cleaning solution, such as laundry detergent or soap, which requires a specified volume to create a cleaning solution. Other advantages will become more well-known through the description of the operation of the present disclosure described below.

Figure 6:
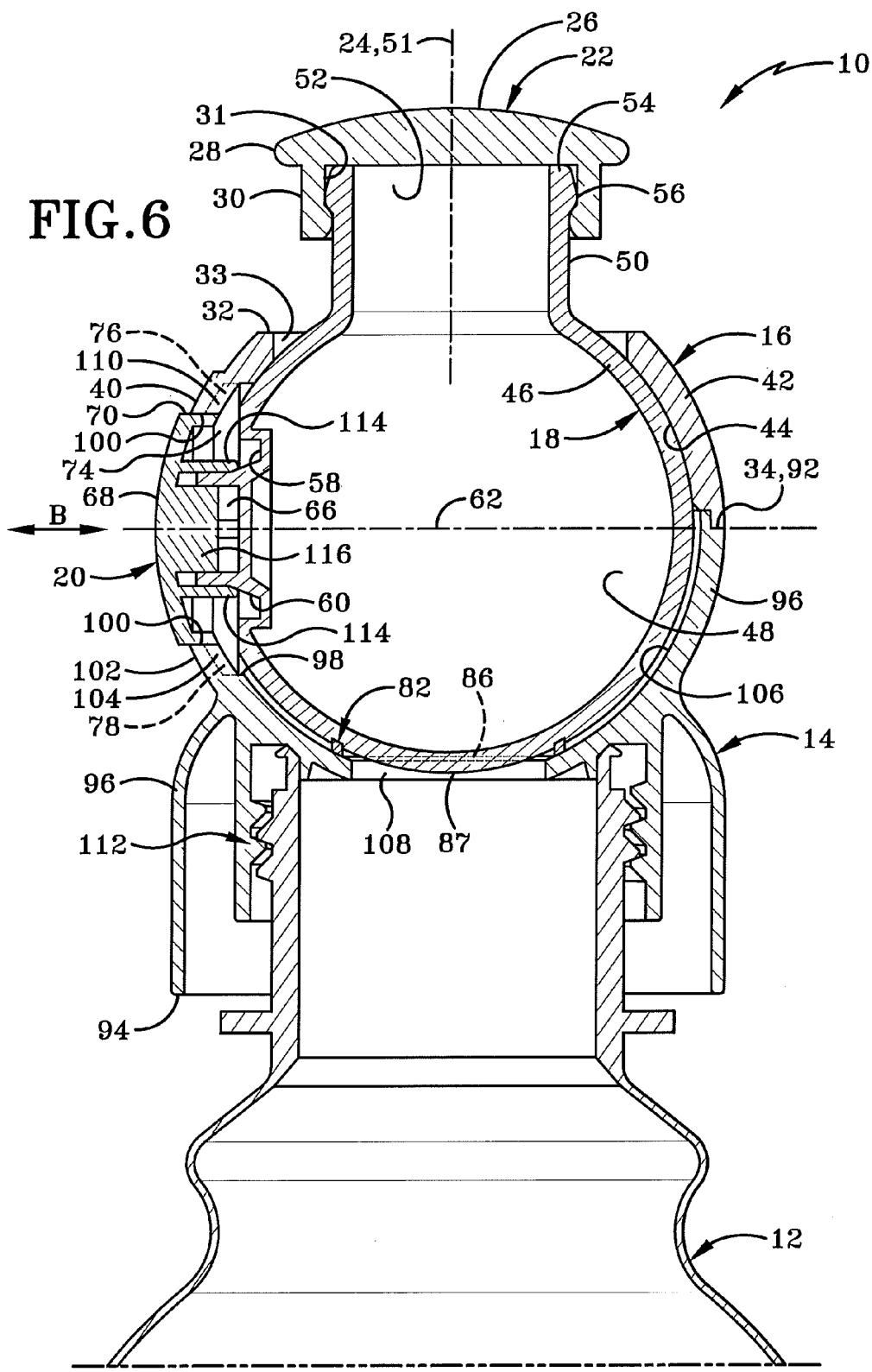
FIG. 6 is a cross section view of the measured fluid dispenser taken along line 6-6 in FIG. 1.

In operation and with reference to FIG. 6, measured fluid dispenser 10 is depicted in cross section depicting flexible fingers 114 on button lock 20. Flexible fingers 114 are disposed along the outer surface of cylindrical projection 64 terminating near the base of tapered sidewall 60. A cross-shaped projection 116 is shaped complimentary to X-shaped channel 66 and is disposed therein. Button lock 20 is depressed along transverse axis 62 in the direction of arrow B. As button lock 20 is depressed to the right in FIG. 6, flexible fingers 114 move towards longitudinal center axis 24 wherein the ends of flexible fingers 114 ride up along tapered wall 60. Cross-shaped projection 116 moves to the right towards longitudinal center line deeper into X-shaped channel 66 (i.e., cross-shaped). The annular recess 58 in an alternative embodiment could receive a spring to apply outward force, pushing lock member 20 away from longitudinal axis 24 to ensure protrusions 104, 110 lock button 20 in place when disposed within first and second notches 76, 78.

Figure 7:
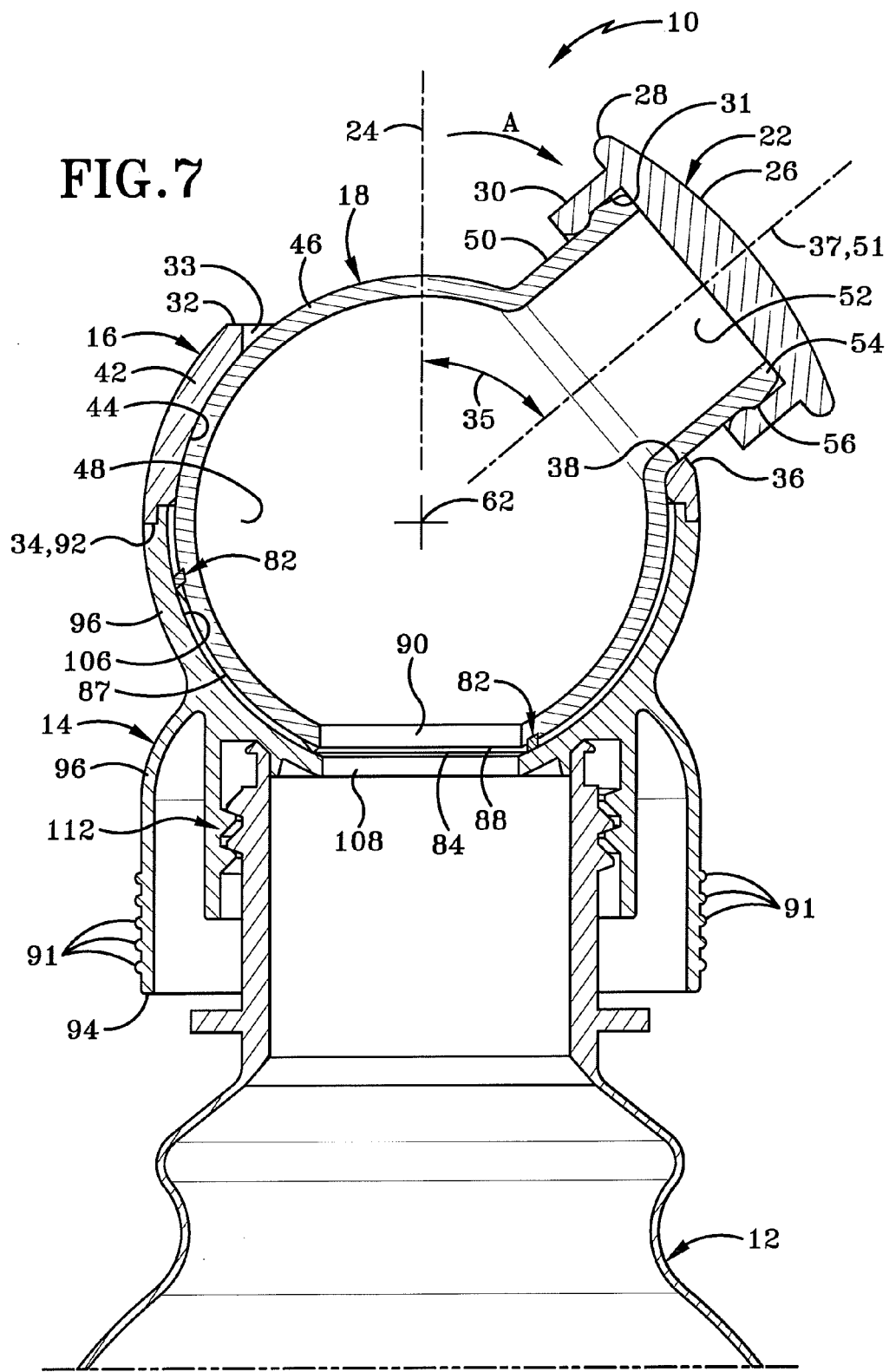
FIG. 7 is an operational cross section view of the measured fluid dispenser rotated about the transverse axis, similar to FIG. 4.

In operation and with reference to FIG. 7 when unlocked, spherical member 18 is rotated in the direction of arrow A to align opening 90 with opening 108 creating a fluid communication between bottle 12 and interior volume 48. The rotation of spherical member 18 in the direction of arrow A occurs when button lock 20 (see FIG. 6) is depressed such that protrusions 104, 110 are out of sync with openings 76, 78 (see FIG. 4 also).

Figure 8:
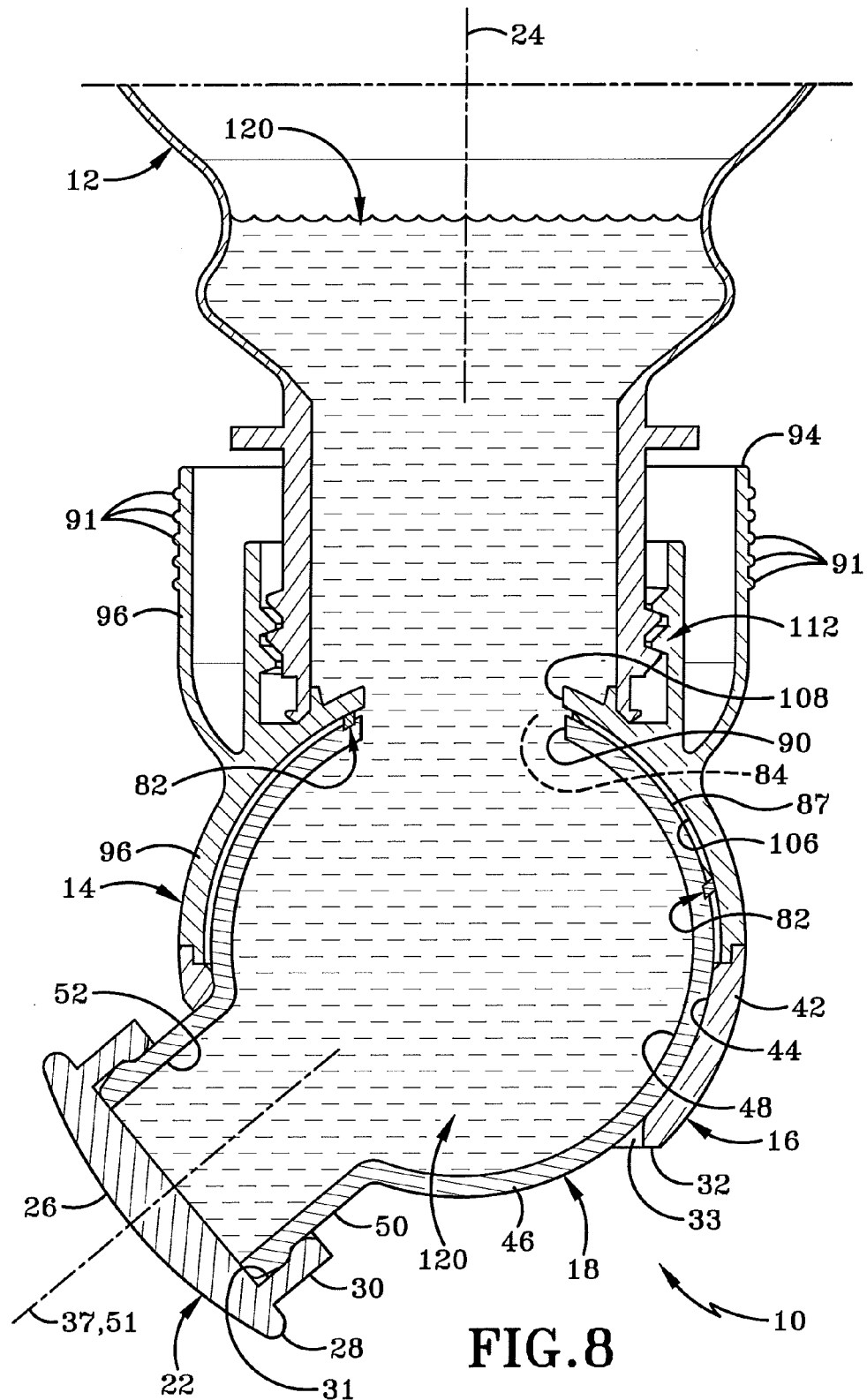
FIG. 8 is an operational cross section view of the measured fluid dispenser inverted allowing fluid to flow into the dispenser under gravitational forces.

In operation and with reference to FIG. 8, with opening 90 and opening 108 in fluid communication, the bottle 12 with measured fluid dispenser 10 attached thereto, is inverted (i.e., turned upside down) allowing fluid 120 to flow into interior volume 48 under gravitational forces. Fluid 120 fills interior volume 48 and is retained within volume 48 via cap 22 releasably secured to spout 50. The openings 90, 108 intersect longitudinal axis 24 and top opening 52 is out of plane relative to longitudinal axis 24. Stated otherwise, when opening 90 of spherical body 46 intersects longitudinal axis 24, opening 52 of spout 50 is out of plane relative to longitudinal axis 24. Further, with opening 52 out of plane relative to longitudinal axis 24 spout 50 is disposed within cutout area 38 defined by U-shaped edge 36 of housing 16.

Figure 9:
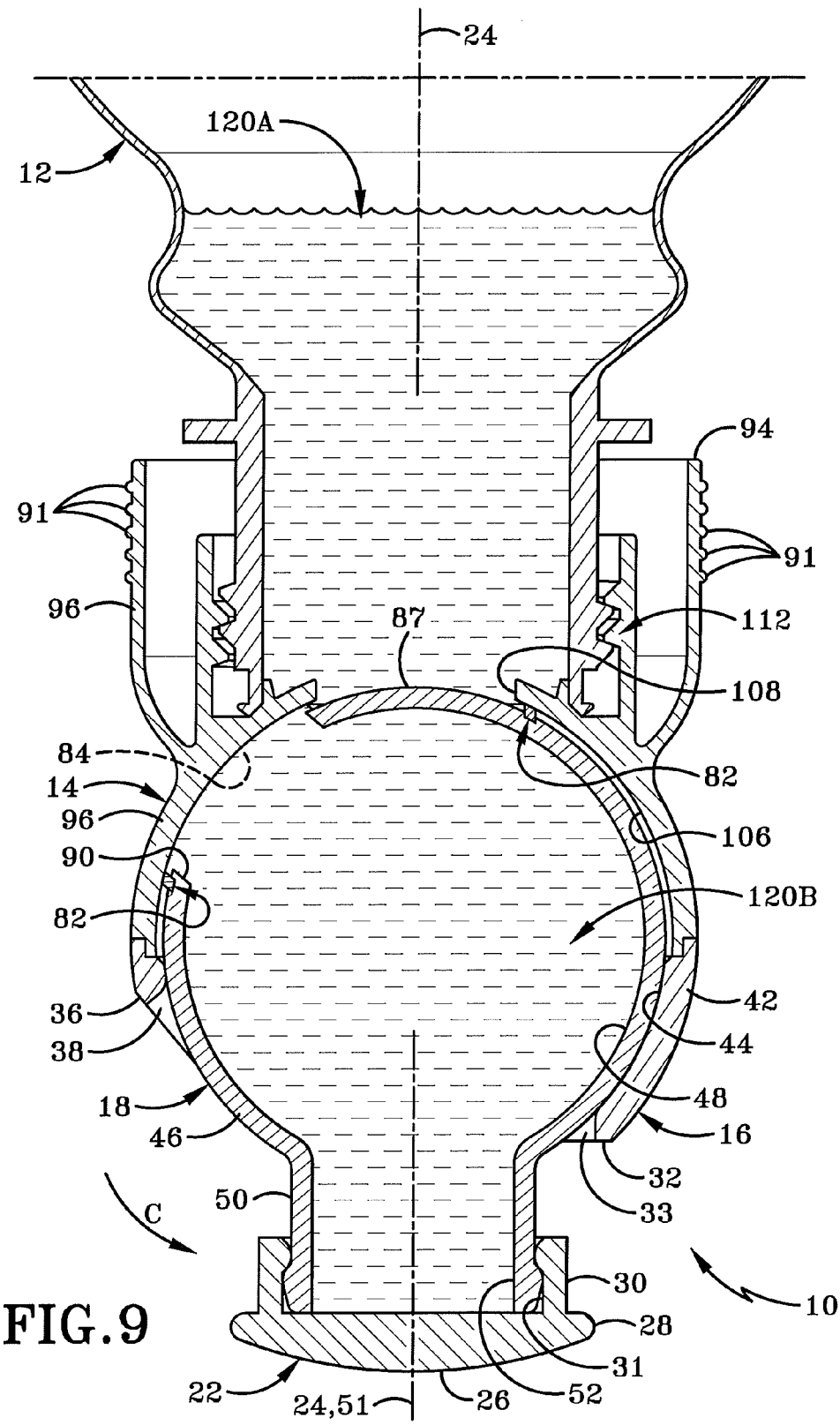
FIG. 9 is an operational cross section view of the measured fluid dispenser separating a measured amount of fluid from the remainder of the fluid in the bottle.

In operation and with reference to FIG. 9, spherical member 18 is then rotated in the direction of arrow C, which is opposite the direction of arrow A, about transverse axis 62. This rotation moves opening 90 out of plane relative to longitudinal axis 24 dividing fluid 120 into two segments 120A and 120B. Fluid 120A remains contained within bottle 12 and measured fluid 120B is contained within interior volume 48. Fluid 120A and 120B are separated from each other in a sealed manner via gasket 82.

The amount of measured fluid 120B desired to be poured out is dependent upon the size of spherical member 18 defining interior volume 48. As will be understood by one having ordinary skill in the art, spherical member 18 when used for dispensing medicine could have an interior volume 48 in a range from about 1, 2, or 3 milliliters to about 10, 15, or 20 milliliters or to about 50, 100, or 500 milliliters. Alternatively, if the measured fluid dispenser 10 is used for cleaning solutions such as laundry detergent, the interior volume 48 may be in a range from about 1, 2, or 3 ounces to about 10, 15, or 20 ounces.

Figure 10:
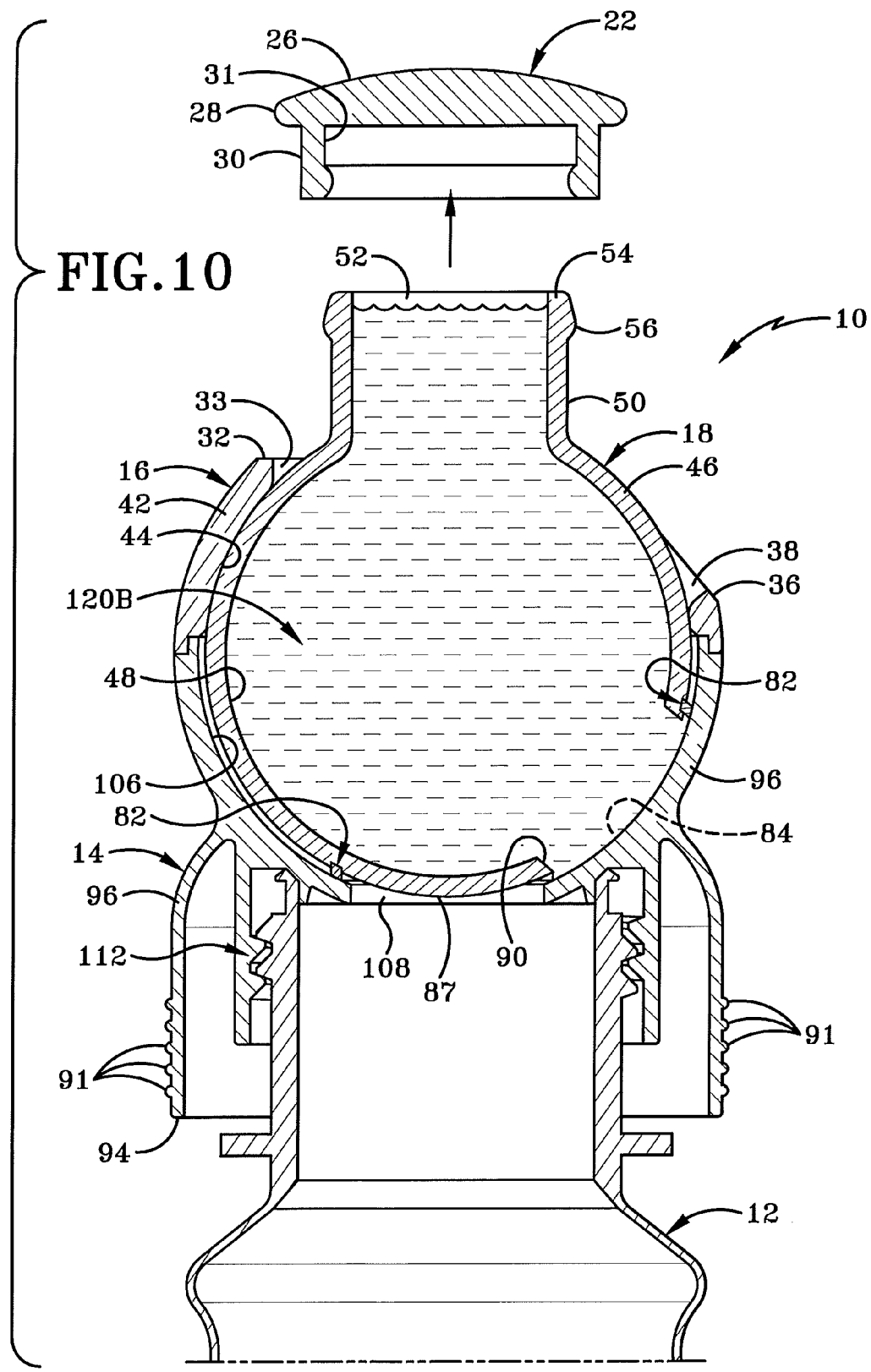
FIG. 10 is an operational cross section view of the measured fluid dispenser removing a cap in order to dispense the measured amount of fluid.

As depicted in FIG. 10, cap 22 may be removed from spout 50 exposing opening 52 to allow measured fluid 120B to be dispensed out from interior chamber 48. As measured fluid 120B is poured out of spout 50, no amount of retained fluid 120A inside bottle 12 is dispensed.

Figure 11:
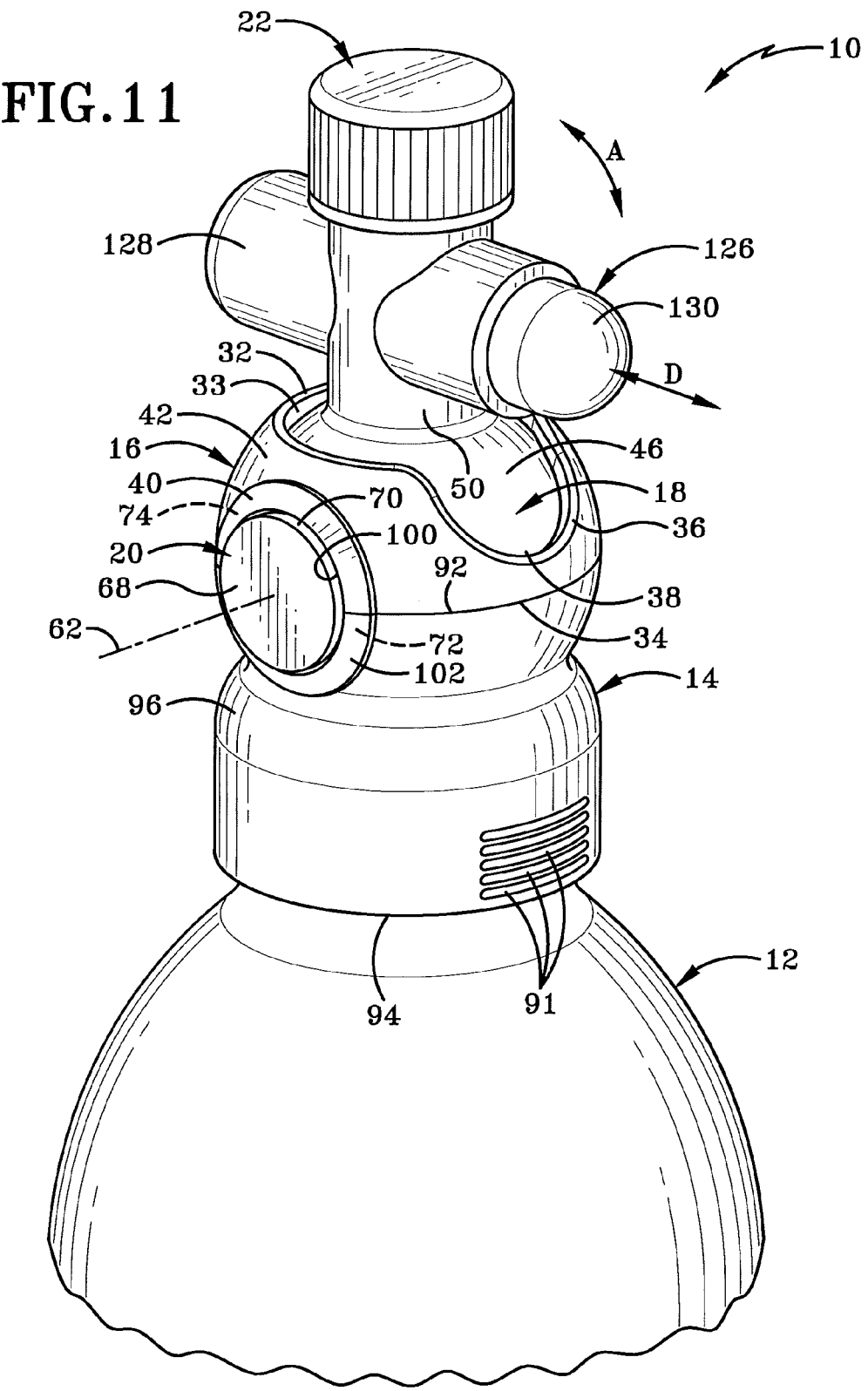
FIG. 11 is another exemplary version of a measured fluid dispenser in accordance with aspects of the present disclosure.

An additional exemplary embodiment of the present disclosure is depicted in FIG. 11. In this alternative exemplary embodiment, the fluid dispenser may include a push button valve 126 including a cylindrical valve body 128 and a push button 130 depressible and moveable in the direction of arrow D. Valve body 128 is integrally formed and perpendicularly intersects spout 50 and moves in unison therewith. Push button valve 126 acts as a release valve to dispense measured fluid 120B when cap 22 is removed.

Figure 12:
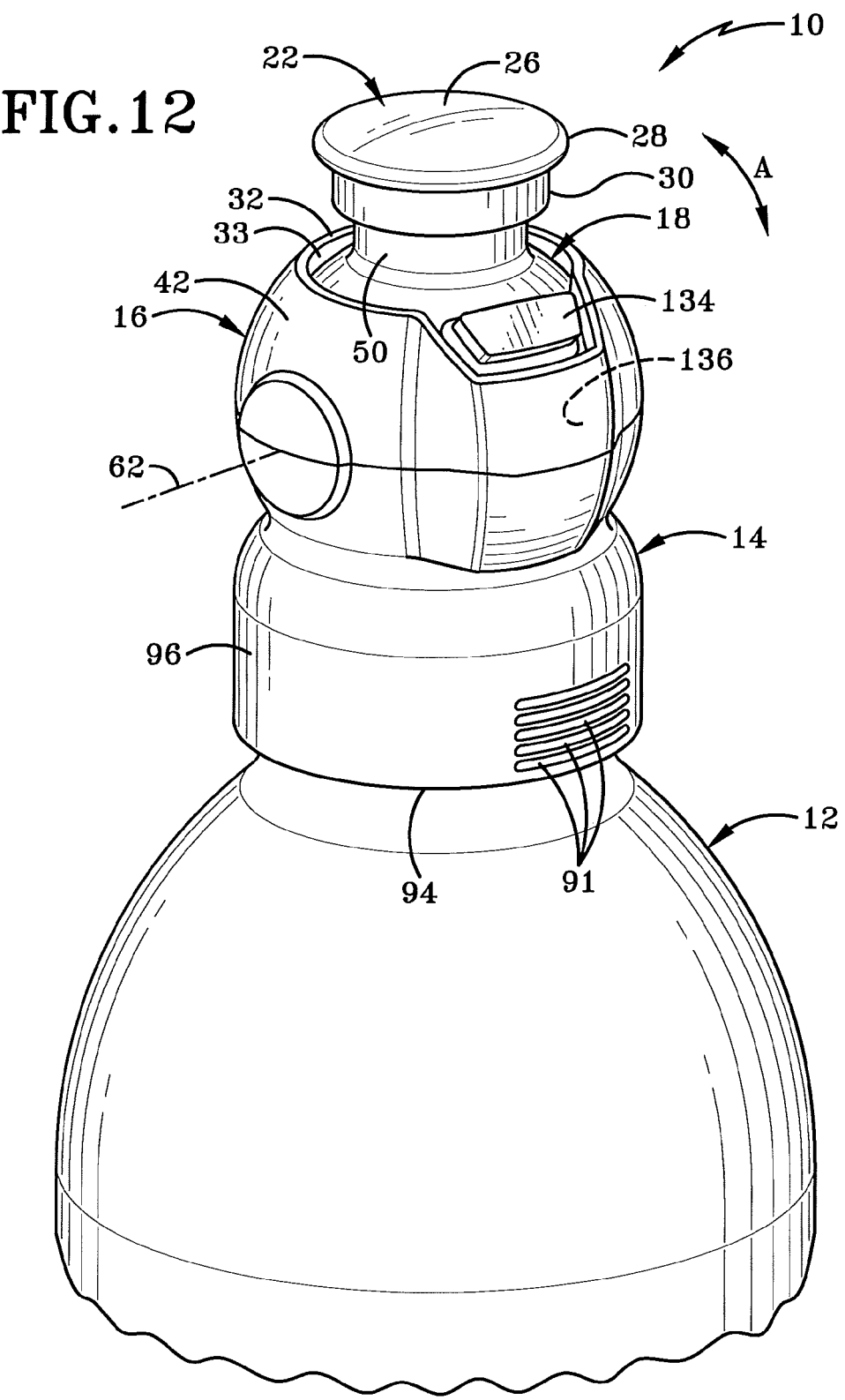
FIG. 12 is yet another exemplary version of a measured fluid dispenser in accordance with aspects of the present disclosure.

An additional exemplary embodiment is provided in FIG. 12 depicting a fluid dispenser wherein button lock 134 is offset from transverse axis 62 and is adapted to rotate thereabout with spherical member body 18. Button lock 134 on spherical member 18 slides within a channel 136 defined by first and second housing 14, 16 respectively. When button 134 is depressed, spherical member body 18 may be rotated in the direction of arrow A about axis 62. The depressed button moves within channel 136 to allow the internal volume to fill with fluid 120 as described in similar details provided above. This alternative exemplary embodiment of measured fluid dispenser 10 has a button 134 that revolves around axis 62 in unison with member body 18.

Figure 13:
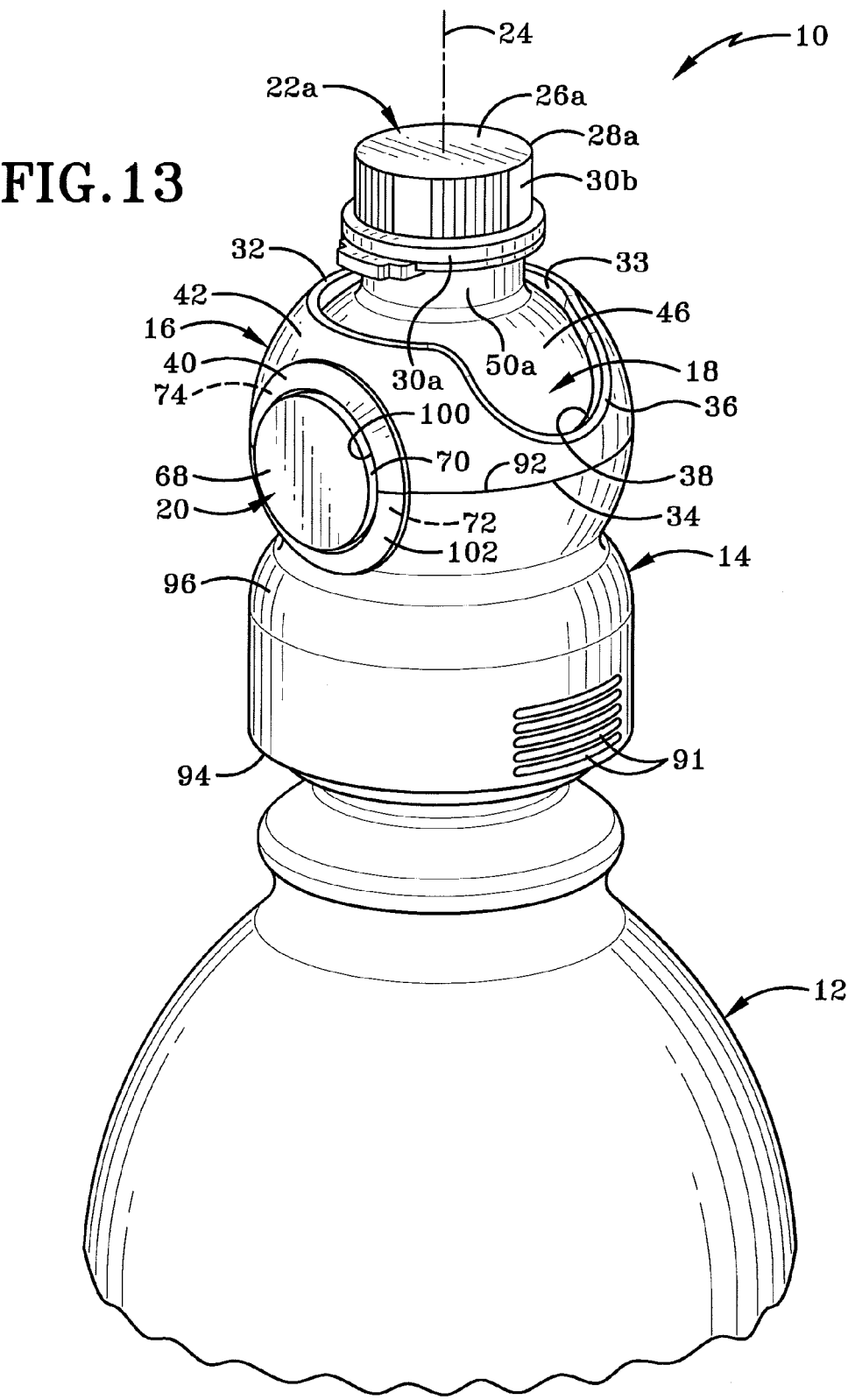
FIG. 13 is yet another exemplary version of a measured fluid dispenser in accordance with aspects of the present disclosure.

As depicted in FIG. 13, another exemplary cap 22A may be employed that has a child safety tamper resistant release, as one having ordinary skill in the art would understand. Cap 22A has an upwardly facing top surface 26A and a downwardly extending cylindrical sidewall 30B terminating at a circumferential child-safe rim 30A. Rim 30A may be a child safety device that is similarly found on prescription bottle caps as one having ordinary skill in the art would understand.

In the embodiment of FIG. 13, cap 22A may form a first child safety cap and the bottom of housing 14 may form a second child safety cap attaching lower housing 14 to bottle 12 that can only be released by the depression of gripping members defining a thumb region 91 attached to tapering flanges 93. Thus, one embodiment of the present disclosure may include a fluid dispensing mechanism that has a first child resistant device connecting a lower end of the device to bottle 12 and a second child resistant tamper proof device that prevents unwanted release of the fluid from internal volume 48 out of opening 52 unless cap 22A is purposefully released.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the sample embodiment of the disclosure are an example and the disclosure is not limited to the exact details shown or described.

What is claimed:
1. A fluid dispenser comprising:
   a housing first portion adapted to be coupled with a container filled with fluid;

a moveable fluid measuring and dispensing member at least partially received within the housing first portion, wherein the fluid measuring and dispensing member is adapted to fluidly communicate with the container to measure fluid to be dispensed therefrom;

wherein the fluid measuring and dispensing member moves between a closed first position and an open second position and the amount of fluid dispensed depends on the size of the fluid measuring and dispensing member;

the fluid dispenser further comprising:

a housing second portion receiving the fluid measuring and dispensing member therein, and the housing second portion adjoining the housing first portion at a union; and wherein the housing second portion includes a generally circular upper edge interrupted by a downwardly extending U-shaped cutout, wherein the U-shaped cutout receives a spout of the measuring and dispensing member therethrough in the open second position.

2. The fluid dispenser of claim 1, wherein the fluid measuring and dispensing member includes:

a body portion defining an internal volume;

the spout extending from the body portion in fluid communication with the internal volume and adapted to dispense fluid from the internal volume.

3. The fluid dispenser of claim 2, wherein the fluid measuring and dispensing member further includes:

a spout axis, wherein the spout is centered along the spout axis;

an aperture formed in the body portion offset from and not intersecting the spout axis.

4. The fluid dispenser of claim 3, wherein the body portion is spherical.

5. The fluid dispenser of claim 2, further comprising:

a longitudinal axis associated with the housing first portion, and wherein a spout axis and the longitudinal axis are coplanar when the fluid measuring and dispensing member is in the closed first position, and wherein the spout axis and the longitudinal axis are offset when the fluid measuring and dispensing member is in the open second position defining a first angle therebetween.

6. The fluid dispenser of claim 5, wherein the first angle is a range from about 15 degrees to about 85 degrees.

7. The fluid dispenser of claim 1, further comprising:

a longitudinal first axis;

a transverse second axis, wherein the fluid measuring and dispensing member moves about the transverse second axis.

8. The fluid dispenser of claim 7, wherein the transverse second axis is coplanar with the union of the housing first and second portions.

9. The fluid dispenser of claim 1, further comprising:

a lock member selectively locking the fluid measuring and dispensing member in the closed first position.

10. A method of using the fluid dispenser of claim 1, comprising the steps of:

moving the fluid measuring and dispensing member defining the internal volume from the closed first position to the open second position within the housing attached to the fluid filled container;

inverting the container to effect fluid movement into the internal volume via gravitational force;

moving the fluid measuring member and dispensing member from the open second position back to the closed position to retain an amount of fluid inside the internal volume; and reverting the container to an upright position.

11. The method of claim 10, further comprising the step of: pouring the fluid from the internal volume through the spout on the fluid measuring and dispensing member.

12. The method of claim 10, wherein the step of moving a fluid measuring and dispensing member from a first closed position to a second open position is accomplished by rotating a spherical body about a transverse axis.

13. The method of claim 12, wherein the step of rotating the spherical body about the transverse axis is accomplished by offsetting a spout axis from a coplanar alignment with a housing longitudinal axis, wherein the spout axis is offset in a range from about 15 degrees to about 85 degrees.

14. The method of claim 10, wherein prior to the step of moving the fluid measuring and dispensing member from the closed first position to the open second position includes the step of selectively unlocking a lock member operably coupled to a spherical body portion of the fluid measuring and dispensing member.

15. The method of claim 14, wherein the step of selectively unlocking the lock member is accomplished by depressing a lock push button in a direction towards a longitudinal axis associated with the housing.

16. The method of claim 10, wherein prior to the step of moving the fluid measuring and dispensing member from the closed first position to the open second position includes the step threadably coupling the fluid measuring and dispensing member to the container, wherein the container is filled with liquid medicine.

17. A fluid dispenser for measuring and dispensing fluid contained in a container, the fluid dispenser comprising:

a housing configured to be coupled in fixed relation to the container, the housing having a first housing opening and a second housing opening, wherein the first housing opening is configured to be in fluid communication with an opening in the container to permit the fluid to flow out of the container through the first housing opening; and a moveable fluid measuring and dispensing member at least partially disposed within the housing and being rotatable relative to the housing, the moveable fluid measuring and dispensing member having a body portion and a spout extending from the body portion, wherein the body portion is slidably movable within the housing and defines an internal chamber having a volume for measuring an amount of the fluid to be dispensed, the body portion further having an inlet opening extending through the body portion to open inwardly into the internal chamber to allow the fluid from the container to enter the internal chamber, and wherein the spout has an outlet opening in fluid communication with the internal chamber, the outlet opening being configured to open outwardly of the fluid dispenser to allow the fluid contained in the internal chamber to be dispensed therefrom;

wherein the movable fluid measuring and dispensing member is rotatable between an open position, in which the inlet opening of the body portion is at least partially aligned with the first housing opening to permit fluid flow from the container into the internal chamber, and a closed position, in which the inlet opening of the body portion is offset from the first housing opening, and in which at least one sealing surface restricts fluid flow from the container into the internal chamber and restricts fluid contained in the internal chamber from flowing into the container; and wherein the spout extends outwardly from the body portion of the moveable fluid measuring and dispensing member through the second housing opening, the spout being movable within the second opening and with the body portion as the body portion moves within the housing, and the spout being configured to extend outwardly of the housing to permit a user to rotate the moveable fluid measuring and dispensing member between the open and closed positions via the spout.

18. The fluid dispenser of claim 17, wherein the body portion of the moveable fluid measuring and dispensing member is spherical, and the spout is an elongated tube that is integral and unitary with the spherical body portion.

19. The fluid dispenser of claim 17, wherein the second housing opening is defined by an edge having a U-shaped portion configured to receive a portion of the spout when the moveable fluid measuring and dispensing member is in the open position.

20. The fluid dispenser of claim 17, further comprising a locking mechanism extending through the housing, the locking mechanism being movable between a locked position, in which the locking mechanism interferes with the relative movement between the housing and the moveable fluid measuring and dispensing member, and an unlocked position in which the locking mechanism provides a clearance to permit relative movement between the housing and the moveable fluid measuring and dispensing member.

21. A fluid dispenser comprising:
   a housing first portion adapted to be coupled with a container filled with fluid;
   a moveable fluid measuring and dispensing member at least partially received within the housing first portion, wherein the fluid measuring and dispensing member is adapted to fluidly communicate with the container to measure fluid to be dispensed therefrom;
   wherein the fluid measuring and dispensing member moves between a closed first position and an open second position and the amount of fluid dispensed depends on the size of the fluid measuring and dispensing member;
   wherein the fluid measuring and dispensing member includes:
      a body portion defining an internal volume, wherein the body portion is spherical;
      a spout extending from the body portion in fluid communication with the internal volume and adapted to dispense fluid from the internal volume;
      a spout axis, wherein the spout is centered along the spout axis; and
      an aperture formed in the body portion offset from and not intersecting the spout axis; and
   wherein the fluid dispenser further comprises:
   a figure-eight shaped seal engaging an outer surface of the spherical body portion;
   the figure-eight shaped seal defining a first aperture and a second aperture, wherein the first aperture defined by the seal is aligned with the aperture formed in the spherical body portion, and the second aperture defined by the seal is adjacent the spherical body and adapted to preclude fluid movement from the container to the internal volume.

22. The fluid dispenser of claim 21, wherein the seal is carried by the spherical body portion and moves therewith.

* * * * *